United States Patent
Poeppel et al.

(10) Patent No.: US 10,343,698 B2
(45) Date of Patent: Jul. 9, 2019

(54) DISABLING ONBOARD INPUT DEVICES IN AN AUTONOMOUS VEHICLE

(71) Applicants: Uber Technologies, Inc., San Francisco, CA (US); Volvo Car Corporation, Gothenburg (SE)

(72) Inventors: Scott C. Poeppel, Pittsburgh, PA (US); Nicholas G. Letwin, Pittsburgh, PA (US); Sean J. Kelly, Pittsburgh, PA (US); Hans Jonas Nilsson, Molndal (SE); Carl Henrick Mathias Westlund, Lerum (SE)

(73) Assignee: Uber Technologies, Inc., San Francisco, CA (US)

( * ) Notice: Subject to any disclaimer, the term of this patent is extended or adjusted under 35 U.S.C. 154(b) by 74 days.

(21) Appl. No.: 15/634,067

(22) Filed: Jun. 27, 2017

(65) Prior Publication Data
US 2018/0370543 A1 Dec. 27, 2018

(51) Int. Cl.
*B60W 50/12* (2012.01)
*B60W 50/14* (2012.01)
*B60K 35/00* (2006.01)

(52) U.S. Cl.
CPC .......... *B60W 50/12* (2013.01); *B60K 35/00* (2013.01); *B60W 50/14* (2013.01); *B60W 2050/146* (2013.01)

(58) Field of Classification Search
CPC . B60W 50/12; B60W 50/14; B60W 2050/146
See application file for complete search history.

(56) References Cited

U.S. PATENT DOCUMENTS

| 4,673,356 A | * | 6/1987 | Schmidt | ............... G09B 9/16 434/35 |
| 6,584,383 B2 | | 6/2003 | Pippenger | |

(Continued)

FOREIGN PATENT DOCUMENTS

| DE | 102014205830 | 10/2015 |
| EP | 2840000 | 2/2015 |
| FR | 3039123 | 1/2017 |

OTHER PUBLICATIONS

Davies, Alex, "We Take a Ride in the Self-Driving Uber Now Roaming Pittsburgh", Wired, Retrieved from the Internet on Dec. 12, 2018: https://www.wired.com/2016/09/self-driving-autonomous-uber-pittsburgh/, Sep. 14, 2016, 3 pages.

(Continued)

*Primary Examiner* — Calvin Cheung
(74) *Attorney, Agent, or Firm* — Dority & Manning, P.A.

(57) ABSTRACT

Systems and methods for disabling autonomous vehicle input devices are provided. In one example embodiment, a computer implemented method includes identifying an operating mode of an autonomous vehicle. The method includes determining one or more vehicle input devices to be disabled based at least in part on the operating mode of the autonomous vehicle. The vehicle input devices are located onboard the autonomous vehicle. The method includes disabling the one or more vehicle input devices based at least in part on the identified operating mode of the autonomous vehicle such that an input by a user with respect to the one or more vehicle input devices does not affect an operation of the autonomous vehicle.

20 Claims, 5 Drawing Sheets

(56) References Cited

U.S. PATENT DOCUMENTS

| | | |
|---|---|---|
| 6,664,888 B1 | 12/2003 | Bishop |
| 8,260,482 B1 | 9/2012 | Szybalski et al. |
| 9,352,752 B2 | 5/2016 | Cullinane et al. |
| 9,463,793 B2 | 10/2016 | Lied et al. |
| 2007/0043482 A1* | 2/2007 | Aimar .................... G01C 23/00 701/4 |
| 2011/0071718 A1 | 3/2011 | Norris et al. |
| 2014/0277896 A1 | 9/2014 | Lathrop et al. |
| 2015/0004573 A1* | 1/2015 | Bomer .................... G09B 9/04 434/219 |
| 2016/0375925 A1 | 12/2016 | Lubischer et al. |
| 2016/0375926 A1 | 12/2016 | Lubischer et al. |
| 2017/0057520 A1 | 3/2017 | Letwin et al. |
| 2017/0253192 A1* | 9/2017 | Faist .................. B60R 11/0264 |

OTHER PUBLICATIONS

EPO Extended Search Report for 18179015.5-1012, dated Nov. 28, 2018, 9 pages.

\* cited by examiner

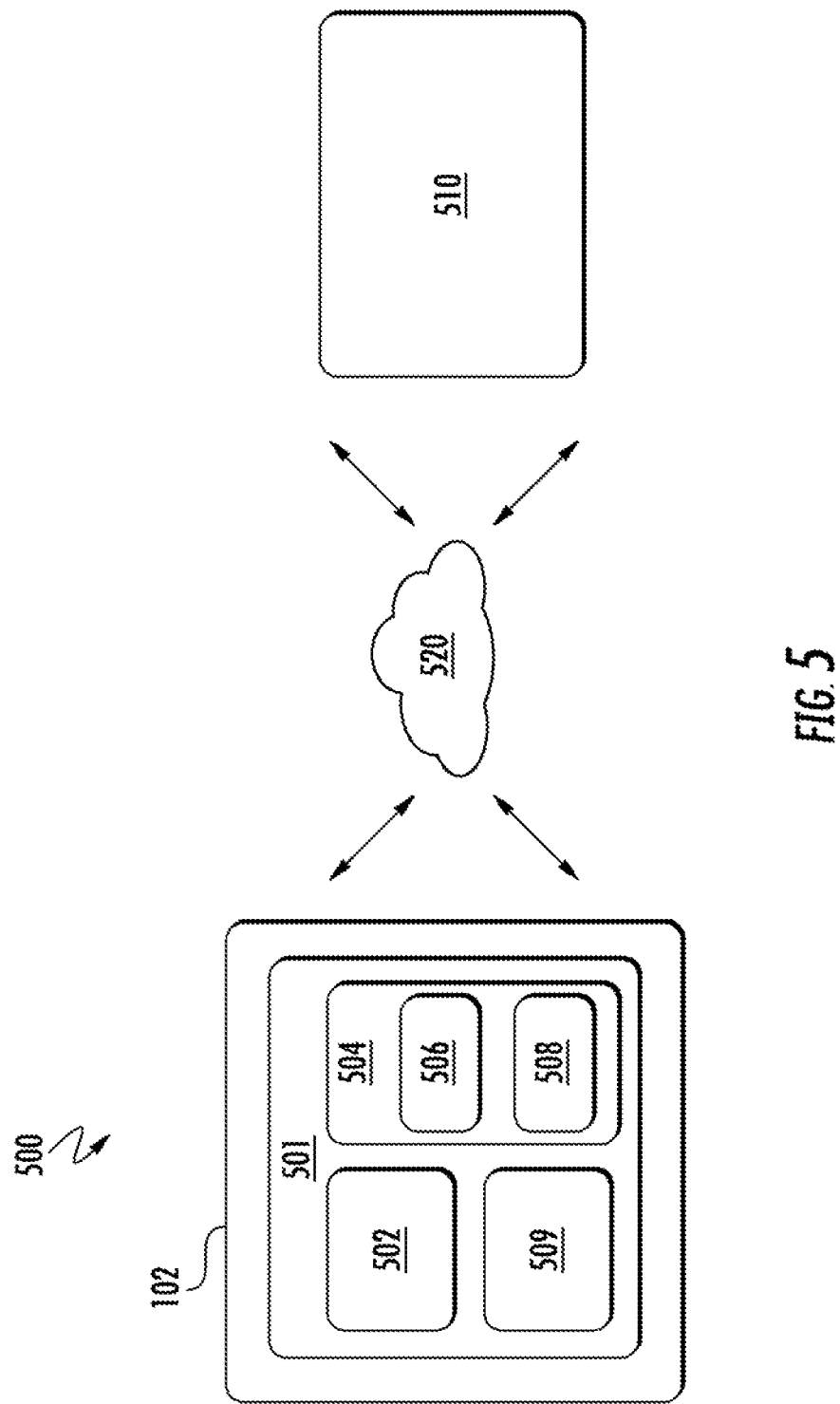

DISABLING ONBOARD INPUT DEVICES IN AN AUTONOMOUS VEHICLE

FIELD

The present disclosure relates generally to disabling vehicle input devices of an autonomous vehicle based on the operating mode of the vehicle.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of disabling autonomous vehicle input devices. The method includes identifying, by a computing system comprising one or more computing devices, an operating mode of an autonomous vehicle. The method includes determining, by the computing system, one or more vehicle input devices to be disabled based at least in part on the operating mode of the autonomous vehicle. The vehicle input devices are located onboard the autonomous vehicle. The method includes disabling, by the computing system, the one or more vehicle input devices based at least in part on the identified operating mode of the autonomous vehicle such that an input by a user with respect to the one or more vehicle input devices does not affect an operation of the autonomous vehicle.

Another example aspect of the present disclosure is directed to a computing system for disabling autonomous vehicle input devices. The computing system includes one or more processors and one or more tangible, non-transitory, computer readable media that collectively store instructions that when executed by the one or more processors cause the computing system to perform operations. The operations include identifying that an autonomous vehicle is operating in a fully autonomous operating mode. The operations include determining one or more vehicle input devices to be disabled based at least in part on the fully autonomous operating mode of the autonomous vehicle. The vehicle input devices are located onboard the autonomous vehicle. The operations include disabling the one or more vehicle input devices such that an input by a user with respect to the one or more vehicle input devices does not affect an operation of the autonomous vehicle.

Yet another example aspect of the present disclosure is directed to an autonomous vehicle. The autonomous vehicle includes one or more vehicle input devices. The autonomous vehicle includes one or more processors and one or more tangible, non-transitory, computer readable media that collectively store instructions that when executed by the one or more processors cause the autonomous vehicle to perform operations. The operations include identifying that the autonomous vehicle is operating in an operating mode. The autonomous vehicle is configured to operate in a plurality of operating modes. The operations include providing one or more control signals to disable the one or more vehicle input devices based at least in part on the operating mode such that an input by a user with respect to the one or more vehicle input devices does not affect an operation of the autonomous vehicle.

Other example aspects of the present disclosure are directed to systems, methods, vehicles, apparatuses, tangible, non-transitory computer-readable media, and memory devices for disabling input devices of an autonomous vehicle.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 5 depicts example system components according to example embodiments of the present disclosure.

DETAILED DESCRIPTION

Figure 1:
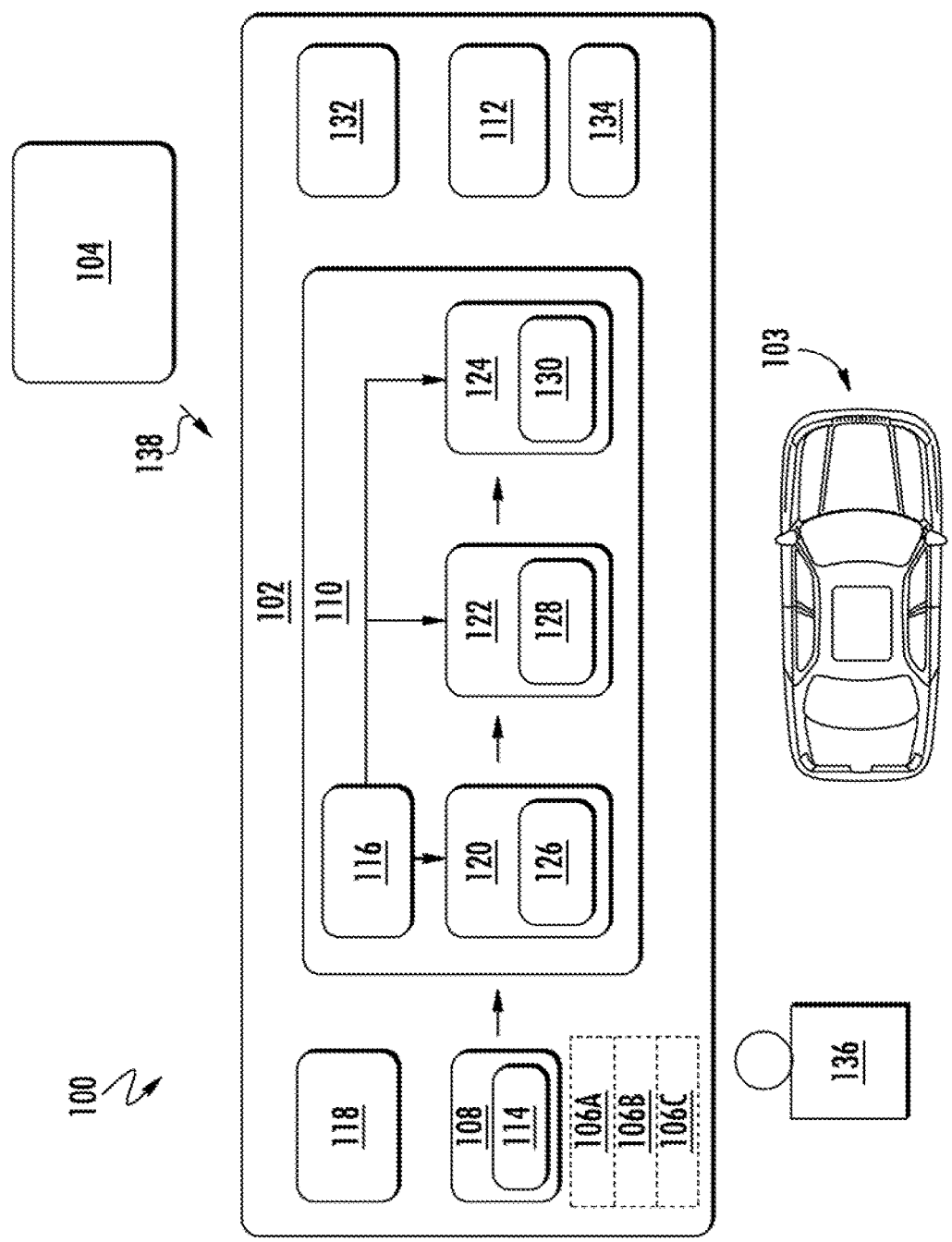
FIG. 1 depicts an example system overview according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to disabling user input devices within the cabin of an autonomous vehicle based on the operating mode of the vehicle. For instance, an entity (e.g., service provider) can use a fleet of vehicles to provide a vehicle service (e.g., transportation service) to a plurality of users. The fleet can include, for example, autonomous vehicles that can drive, navigate, operate, etc. with minimal and/or no input from a human driver. The autonomous vehicles can be configured to operate in a plurality of operating modes such as a manual operating mode (e.g., the vehicle is fully controlled by a human driver), a semi-autonomous operating mode (e.g., the vehicle operates with some input from a human driver), and/or a fully autonomous operating mode (e.g., vehicle operates with no input from a human driver). The autonomous vehicles can also be configured to provide one or more vehicle services such as, for example, a transportation service (e.g., rideshare service). To help prevent a user of the vehicle service (e.g., a passenger of the rideshare service) from interfering with the operation of the vehicle, one or more vehicle input devices that control various aspects of the vehicle can be disabled from the user. By way of example, an autonomous vehicle can operate in a fully autonomous operating mode to provide a rideshare service to a user. While doing so, the vehicle input devices that control the motion of the vehicle (e.g., steering mechanism, braking mechanism, acceleration mechanism, etc.) can be disabled such that input (e.g., physical manipulation, voice activation, etc.) by the user with respect to such vehicle input devices will not affect the motion of the vehicle. In some implementations, the vehicle's motion indicators (e.g., turn signals, hazard lights, etc.) can also be disabled to prevent a user from falsely indicating a motion of the vehicle (e.g., falsely indicating a turn). In some implementations, all vehicle input devices (include those affecting motion and motion indication) can be disabled. Accordingly, disablement of certain (and/or all) vehicle input device(s) can help prevent a user of the vehicle services from interfering with the operation of the autonomous vehicle in order to increase user and vehicle safety.

More particularly, an entity (e.g., service provider, owner, manager) can use one or more vehicles (e.g., ground-based vehicles) to provide a vehicle service such as a transportation service (e.g., rideshare service), a courier service, a delivery service, etc. The vehicle(s) can be autonomous vehicles that include various systems and devices configured to control the operation of the vehicle. For example, an autonomous vehicle can include an onboard vehicle computing system for operating the vehicle. The vehicle computing system can receive sensor data from sensor(s) onboard the vehicle (e.g., cameras, LIDAR, RADAR, etc.), attempt to comprehend the surrounding environment by performing various processing techniques on data collected by the sensor(s), and generate an appropriate motion plan through such surrounding environment.

The autonomous vehicle can also include one or more vehicle input devices that are configured to adjust the operation of the vehicle based at least in part on user input with respect to the vehicle input device(s). For example, the autonomous vehicle can include one or more vehicle input devices that are configured to affect the motion of the vehicle. Such vehicle input device(s) can include a steering mechanism (e.g., steering wheel, control stick), a braking mechanism (e.g., brake pedal, parking brake), an acceleration mechanism (e.g., gas pedal, hand throttle), and/or other devices. The vehicle input device(s) can also include a power state adjustment mechanism (e.g., push button, key switch, ignition, other interface). The vehicle input device(s) can also include one or more vehicle input device(s) that are configured to control an indication of vehicle motion. For example, the vehicle input device(s) can include a turn indication mechanism (e.g., turn signal control device), a hazard indication mechanism (e.g., hazard lights activation button), and/or other devices. In some implementations, the vehicle input device(s) can be associated with other features of the autonomous vehicle. For instance, the vehicle input device(s) can be associated with the control of the windows, windshield wipers, temperature, defrost, etc. When the vehicle input device(s) are enabled, a user can adjust the vehicle input device(s) to affect the operation of the vehicle (e.g., to control motion, motion indication, etc.).

An autonomous vehicle can be configured to operate in a plurality of operating modes. For example, an autonomous vehicle can be configured to operate in a fully autonomous (e.g., self-driving) operating mode in which the autonomous vehicle can drive and navigate with no interaction from a user present in the vehicle. The autonomous vehicle can be configured to operate in a semi-autonomous operating mode in which the autonomous vehicle can operate with some interaction from a user present in the vehicle. In some implementations, the autonomous vehicle can enter into a manual control mode in which the vehicle is fully controllable by a user (e.g., human driver) and can be prohibited from performing autonomous navigation (e.g., autonomous driving).

The operating mode of an autonomous vehicle can be adjusted in a variety of manners. In some implementations, the operating mode of the autonomous vehicle can be selected remotely, off board the autonomous vehicle. For example, an entity associated with the autonomous vehicle (e.g., a service provider) can utilize an operations computing system that is remote from the autonomous vehicle to manage the vehicles (and/or an associated fleet). The operations computing system can send a communication to the autonomous vehicle instructing the autonomous vehicle to enter into, exit from, maintain, etc. an operating mode. By way of example, the operations computing system can send a communication to the autonomous vehicle instructing the autonomous vehicle to enter into the fully autonomous operating mode when providing a rideshare service to a user. In some implementations, the operating mode of the autonomous vehicle can be set locally (e.g., onboard, near the vehicle). For example, the operating mode of the autonomous vehicle can be selected via a secure interface (e.g., physical switch interface, graphical user interface) onboard the vehicle and/or associated with a computing device proximate to the vehicle (e.g., a tablet operated by authorized personnel located near the vehicle). The vehicle computing system can cause the autonomous vehicle to enter into an operating mode (e.g., fully autonomous operating mode).

The vehicle computing system of the autonomous vehicle can identify the operating mode of the autonomous vehicle. The vehicle computing system can obtain data indicating whether the vehicle is in a fully autonomous operating mode, semi-autonomous operating mode, manual operating mode, etc. For example, the vehicle computing system can monitor the state of an onboard interface (e.g., switch interface) to determine whether the vehicle has been set to enter into the fully autonomous operating mode. In some implementations, another computing device onboard the autonomous vehicle that is configured to adjust the operating mode of the vehicle (e.g., a mode manager system) can provide data indicative of the operating mode of the vehicle (e.g., before, during, and/or after the vehicle has completed transition to the operating mode). Additionally, or alternatively, the vehicle computing system can determine the operating mode of the autonomous vehicle based at least in part on a communication provided via a remote computing system (e.g., the operations computing system).

The vehicle computing system can determine one or more vehicle input devices to be disabled based at least in part on the operating mode of the autonomous vehicle. For example, the vehicle computing system can determine that a first set of vehicle input device(s) configured to control and/or otherwise affect the motion of the vehicle (e.g., steering mechanism, braking mechanism, and/or acceleration mechanisms) should be disabled while the vehicle is in the fully autonomous operating mode. Additionally, or alternatively, the vehicle computing system can determine that a second set of vehicle input devices configured to control and/or otherwise affect the indication of motion (e.g., turn signals, hazard lights) should be disabled while the autonomous vehicle is in the fully autonomous operating mode.

In some implementations, the vehicle input device(s) can be disabled according to a tiered approach. For example, the second set of vehicle input devices can be disabled after the first set of vehicle input devices are disabled, such that motion control is disabled before motion indication control. The vehicle computing system can access a data structure (e.g., list, rule, etc.) that indicates which vehicle input device(s) are to be disabled based at least in part on the operating mode of the autonomous vehicle. The data structures can be modified such that additional, fewer, and/or different vehicle input device(s) can be disabled based at least in part on the operating mode of the vehicle. This can be advantageous when vehicle input device(s) are added, removed, and/or changed for newer models of an autonomous vehicle.

The vehicle computing system can disable the one or more vehicle input devices such that an interaction by the user with the one or more vehicle input devices does not affect the operation of the autonomous vehicle. For example, the autonomous vehicle can enter into a fully autonomous (e.g., self-driving) operating mode. The vehicle computing system can send one or more control signals to disable the steering mechanism, braking mechanism, acceleration mechanism, power state adjustment mechanism, etc. such that the user (e.g., a passenger of a rideshare service, delivery service) cannot interfere with the motion of the autonomous vehicle while it autonomously navigates. The vehicle computing system can also send one or more control signals to disable the turn indication mechanisms, hazard indication mechanisms, etc. such that the user cannot interfere with the indication of vehicle motion (e.g., via an incorrect lane change). In this way, the vehicle computing system can disable the vehicle input device(s) that are associated with controlling the motion of the autonomous vehicle and/or indicating vehicle motion to others on a travel way to avoid unwanted user interference. In some implementations, one or more other vehicle input device(s) (e.g., temperature control, wipers, etc.) can be disabled to avoid further user interference.

The vehicle input device(s) can be disabled in a variety of manners. In some implementations, a vehicle input device can be disabled electronically. By way of example, the acceleration mechanism (e.g., gas pedal) of an autonomous vehicle can be associated with a throttle by wire system that controls the acceleration of the vehicle based at least in part on communications from the acceleration mechanism to a control device associated therewith. A throttle by wire system can include an electronic throttle without any cables from the acceleration mechanism to the engine (e.g., a throttle valve of the engine). Such a system can receive inputs from the acceleration mechanism and send commands to control vehicle acceleration. To disable the acceleration mechanism, the vehicle computing system can send one or more control signals to disable communication from the acceleration mechanism such that input signals from the acceleration mechanism are temporarily prevented and/or ignored (e.g., by opening a switch). In this way, the speed of the autonomous vehicle is not affected by compression (or release) of the acceleration mechanism by the user. Similar approaches can be undertaken for steering by wire and/or braking by wire type systems.

In some implementations, a vehicle input device can be disabled mechanically. By way of example, an autonomous vehicle can include a motor that is associated with the steering mechanism (e.g., the steering rack). The motor can control the motion of the steering mechanism. To disable the steering mechanism such that user input is ineffective, the vehicle computing system can send control signal(s) to activate the motor such that the steering mechanism is moved with sufficient force so that a human user cannot overpower the motor to adjust the steering mechanism in another manner (e.g., in an opposite direction). Additionally, or alternatively, the motor could apply a counteractive force to any user input associated with the steering mechanism. In another example, the braking mechanism (e.g., brake pedal) can be associated with an actuator (e.g., linear actuator). To disable the braking mechanism, the vehicle computing system can send control signal(s) to cause the actuator to stiffen and provide a resistance force such that a user cannot compress the braking mechanism. A similar such approach could be used to disable the acceleration mechanism. In some implementations, a vehicle input device can be mechanically disabled such that a user can manipulate the input device but with no effect on the operation of the vehicle. For example, a mechanical device (e.g., actuator, motor) can be disconnected and/or caused to provide no resistance force such that a user can manipulate the vehicle input device (e.g., compress the braking mechanism), but such manipulation would have no effect on the operation of the autonomous vehicle. This can provide a similar approach to the electronic disablement as described herein.

The vehicle computing system can provide an indication that the vehicle input device(s) are disabled. For instance, the vehicle computing system can provide data indicating that the vehicle input device(s) are disabled for display via a user interface. The data can identify the operating mode of the autonomous vehicle, one or more of the vehicle input device(s) that have been disabled, and/or otherwise indicate that the user is not provided with control of the autonomous vehicle. Such information can be displayed by a display device via a textual message, a graphical representation (e.g., symbol, picture, etc.), and/or via other types of communication (e.g., lighting change, audible communication). The display device can be located onboard the autonomous vehicle (e.g., a tablet in the vehicle interior) and/or remotely from the autonomous vehicle (e.g., for an operator that is remote from the vehicle).

In some implementations, the vehicle computing system can identify a change in the operating mode of the vehicle. One or more vehicle input device(s) can be enabled based at least in part on the change in the operating mode of the autonomous vehicle. For example, the autonomous vehicle can finish transporting a user to a destination location and travel to a service depot for scheduled maintenance. The autonomous vehicle can enter into (and/or be caused to enter into) the manual mode such that a technician at the service depot can control the autonomous vehicle. The vehicle computing system can identify that the vehicle has changed from a first operating mode (e.g., a fully autonomous mode) to a second operating mode (e.g., a manual mode) and enable one or more vehicle input devices such that the technician can control the autonomous vehicle. For example, one or more vehicle input devices that were previously disabled during the first operating mode can be enabled when a change to the second operating mode is identified.

The system and methods described herein may provide a number of technical effects and benefits. For instance, unwanted user interference with an autonomous vehicle can be detrimental to the autonomous vehicle as it implements a motion plan to autonomously navigate through its surrounding environment as well as present safety risks to the user, the vehicle, and objects proximate to the vehicle. The systems and methods of the present disclosure can allow the vehicle computing system to disable vehicle input device(s) such that a user is unable to affect the operation of the autonomous vehicle. This can help prevent unwanted user interference with the autonomous vehicle while the vehicle is providing a vehicle service (e.g., transportation service). Moreover, disablement of certain vehicle input device(s) can help eliminate potential sources of error and/or interference with the autonomous operation of the vehicle (e.g., autonomous motion control). As such, the systems and methods of the present disclosure can increase user and vehicle safety, while also improving the performance of the vehicle's autonomy computing and control systems (e.g., through elimination of potential interference).

The systems and methods of the present disclosure also provide an improvement to vehicle computing technology, such as autonomous vehicle computing technology. For instance, the systems and methods described herein enable the vehicle technology to identify an operating mode of the vehicle and disable certain vehicle input devices based at least in part on the operating mode. For example, the systems and methods can allow one or more computing device(s) (e.g., onboard an autonomous vehicle) to identify an operating mode of an autonomous vehicle that is configured to provide a vehicle service to a user. The computing device(s) can determine one or more onboard vehicle input devices to be disabled based at least in part on the operating mode of the autonomous vehicle. The computing device(s) can disable the one or more vehicle input devices such that an input by the user with respect to the one or more vehicle input devices does not affect the operation of the autonomous vehicle. In this way, the systems and methods can provide customization as to which vehicle input device(s) are disabled with respect to the user for a certain operating mode. Such selectivity can lead to computational efficiency and flexibility because it may be important to disable different input device(s) for one operating mode than for another.

Additionally, by disabling the vehicle input device(s) via the vehicle computing system, existing hardware need not be removed from the vehicle. More particularly, the systems and methods can be included in new vehicles and/or provided to existing vehicles without removal of existing control hardware (e.g., steering wheel, brake pedal, gas pedal). This can lead to significant cost and time savings when configuring a new autonomous vehicle, as well as less vehicle downtime when upgrading existing vehicles to use the systems and methods of the present disclosure.

With reference now to the FIGS., example embodiments of the present disclosure will be discussed in further detail. FIG. 1 depicts an example system 100 according to example embodiments of the present disclosure. The system 100 can include a vehicle computing system 102 associated with a vehicle 103. In some implementations, the system 100 can include an operations computing system 104 that is remote from the vehicle 103. In some implementations, the vehicle 103 can be associated with an entity (e.g., a service provider, owner, manager). The entity can be one that provides one or more vehicle service(s) to a plurality of users via a fleet of vehicles that includes, for example, the vehicle 103. In some implementations, the entity can be associated with only vehicle 103 (e.g., a sole owner, manager). In some implementations, the operations computing system 104 can be associated with such an entity.

The vehicle 103 incorporating the vehicle computing system 102 can be a ground-based autonomous vehicle (e.g., car, truck, bus), an air-based autonomous vehicle (e.g., airplane, drone, helicopter, or other aircraft), or other types of vehicles (e.g., watercraft). The vehicle 103 can be an autonomous vehicle that can drive, navigate, operate, etc. with minimal and/or no interaction from a human driver. For instance, the vehicle 103 can be configured to operate in a plurality of operating modes 106A-C. The vehicle 103 can be configured to operate in a fully autonomous (e.g., self-driving) operating mode 106A in which the vehicle 103 can drive and navigate with no input from a user present in the vehicle 103. The vehicle 103 can be configured to operate in a semi-autonomous operating mode 106B in which the vehicle 103 can operate with some input from a user present in the vehicle. In some implementations, the vehicle 103 can enter into a manual operating mode 106C in which the vehicle 103 is fully controllable by a user (e.g., human driver) and can be prohibited from performing autonomous navigation (e.g., autonomous driving).

The operating mode of the vehicle 103 can be adjusted in a variety of manners. In some implementations, the operating mode of the vehicle 103 can be selected remotely, off board the vehicle 103. For example, an entity associated with the vehicle 103 (e.g., a service provider) can utilize an operations computing system 104 to manage the vehicle 103 (and/or an associated fleet). The operations computing system 104 can send a communication to the vehicle 103 instructing the vehicle 103 to enter into, exit from, maintain, etc. an operating mode. By way of example, the operations computing system 104 can send a communication to the vehicle 103 instructing the vehicle 103 to enter into the fully autonomous operating mode 106A when providing a rideshare service to a user. In some implementations, the operating mode of the vehicle 103 can be set onboard and/or near the vehicle 103. For example, the operating mode of the vehicle 103 can be selected via a secure interface (e.g., physical switch interface, graphical user interface) onboard the vehicle 103 and/or associated with a computing device proximate to the vehicle 103 (e.g., a tablet operated by authorized personnel located near the vehicle 103). In some implementations, the vehicle computing system can determine which operating mode the autonomous vehicle should be in and cause the autonomous vehicle to enter into that operating mode.

The vehicle computing system 102 can include one or more computing devices located onboard the vehicle 103 (e.g., located on and/or within the vehicle 103). The computing device(s) can include various components for performing various operations and functions. For instance, the computing device(s) can include one or more processor(s) and one or more tangible, non-transitory, computer readable media. The one or more tangible, non-transitory, computer readable media can store instructions that when executed by the one or more processor(s) cause the vehicle 103 (e.g., its computing system, one or more processors, etc.) to perform operations and functions, such as those described herein.

As shown in FIG. 1, the vehicle 103 can include one or more sensors 108, an autonomy computing system 110, and one or more vehicle control systems 112. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel.

The sensor(s) 108 can be configured to acquire sensor data 114 associated with one or more objects that are proximate to the vehicle 103 (e.g., within a field of view of one or more of the sensor(s) 108). The sensor(s) 108 can include a Light Detection and Ranging (LIDAR) system, a Radio Detection and Ranging (RADAR) system, one or more cameras (e.g., visible spectrum cameras, infrared cameras, etc.), motion sensors, and/or other types of imaging capture devices and/or sensors. The sensor data 114 can include image data, radar data, LIDAR data, and/or other data acquired by the sensor(s) 108. The object(s) can include, for example, pedestrians, vehicles, bicycles, and/or other objects. The object(s) can be located in front of, to the rear of, and/or to the side of the vehicle 103. The sensor data 114 can be indicative of locations associated with the object(s) within the surrounding environment of the vehicle 103 at one or more times. The sensor(s) 108 can provide the sensor data 114 to the autonomy computing system 110.

In addition to the sensor data 114, the autonomy computing system 110 can retrieve or otherwise obtain map data 116. The map data 116 can provide detailed information about the surrounding environment of the vehicle 103. For example, the map data 116 can provide information regarding: the identity and location of different roadways, road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle 103 in comprehending and perceiving its surrounding environment and its relationship thereto.

The vehicle 103 can include a positioning system 118. The positioning system 118 can determine a current position of the vehicle 103. The positioning system 118 can be any device or circuitry for analyzing the position of the vehicle 103. For example, the positioning system 118 can determine position by using one or more of inertial sensors, a satellite positioning system, based on IP address, by using triangulation and/or proximity to network access points or other network components (e.g., cellular towers, WiFi access points, etc.) and/or other suitable techniques. The position of the vehicle 103 can be used by various systems of the vehicle computing system 102 and/or provided to a remote computing device (e.g., of the operations computing system 104). For example, the map data 116 can provide the vehicle 103 relative positions of the surrounding environment of the vehicle 103. The vehicle 103 can identify its position within the surrounding environment (e.g., across six axes) based at least in part on the data described herein. For example, the vehicle 103 can process the sensor data 114 (e.g., LIDAR data, camera data) to match it to a map of the surrounding environment.

The autonomy computing system 110 can include a perception system 120, a prediction system 122, a motion planning system 124, and/or other systems that cooperate to perceive the surrounding environment of the vehicle 103 and determine a motion plan for controlling the motion of the vehicle 103 accordingly. For example, the autonomy computing system 110 can receive the sensor data 114 from the sensor(s) 108, attempt to comprehend the surrounding environment by performing various processing techniques on the sensor data 114 (and/or other data), and generate an appropriate motion plan through such surrounding environment. The autonomy computing system 110 can control the one or more vehicle control systems 112 to operate the vehicle 103 according to the motion plan.

The autonomy computing system 110 can identify one or more objects that are proximate to the vehicle 103 based at least in part on the sensor data 114 and/or the map data 116. For example, the perception system 120 can obtain state data 126 descriptive of a current state of an object that is proximate to the vehicle 103. The state data 126 for each object can describe, for example, an estimate of the object's: current location (also referred to as position); current speed (also referred to as velocity); current acceleration; current heading; current orientation; size/footprint (e.g., as represented by a bounding polygon); class (e.g., pedestrian class vs. vehicle class vs. bicycle class), and/or other state information. The perception system 120 can provide the state data 126 to the prediction system 122 (e.g., for predicting the movement of an object).

The prediction system 122 can create predicted data 128 associated with each of the respective one or more objects proximate to the vehicle 103. The predicted data 128 can be indicative of one or more predicted future locations of each respective object. The predicted data 128 can be indicative of a predicted path (e.g., predicted trajectory) of at least one object within the surrounding environment of the vehicle 103. For example, the predicted path (e.g., trajectory) can indicate a path along which the respective object is predicted to travel over time (and/or the speed at which the object is predicted to travel along the predicted path). The prediction system 122 can provide the predicted data 128 associated with the object(s) to the motion planning system 124.

The motion planning system 124 can determine a motion plan 130 for the vehicle 103 based at least in part on the predicted data 128 (and/or other data). The motion plan 130 can include vehicle actions with respect to the objects proximate to the vehicle 103 as well as the predicted movements. For instance, the motion planning system 124 can implement an optimization algorithm that considers cost data associated with a vehicle action as well as other objective functions (e.g., based on speed limits, traffic lights, etc.), if any, to determine optimized variables that make up the motion plan 130. By way of example, the motion planning system 124 can determine that the vehicle 103 can perform a certain action (e.g., pass an object) without increasing the potential risk to the vehicle 103 and/or violating any traffic laws (e.g., speed limits, lane boundaries, signage). The motion plan 130 can include a planned trajectory, speed, acceleration, etc. of the vehicle 103.

The motion planning system 124 can provide the motion plan 130 with data indicative of the vehicle actions, a planned trajectory, and/or other operating parameters to the vehicle control system(s) 112 to implement the motion plan 130 for the vehicle 103. For instance, the vehicle 103 can include a mobility controller configured to translate the motion plan 130 into instructions. By way of example, the mobility controller can translate a determined motion plan 130 into instructions to adjust the steering of the vehicle 103 "X" degrees, apply a certain magnitude of braking force, etc. The mobility controller can send one or more control signals to the responsible vehicle control component (e.g., braking control system, steering control system, acceleration control system) to execute the instructions and implement the motion plan 130.

The vehicle 103 can include a communications system 132 configured to allow the vehicle computing system 102 (and its computing device(s)) to communicate with other computing devices. The vehicle computing system 102 can use the communications system 132 to communicate with the operations computing system 104 and/or one or more other remote computing device(s) over one or more networks (e.g., via one or more wireless signal connections). In some implementations, the communications system 132 can allow communication among one or more of the system(s) on-board the vehicle 103. The communications system 132 can include any suitable components for interfacing with one or more networks, including, for example, transmitters, receivers, ports, controllers, antennas, and/or other suitable components that can help facilitate communication.

The vehicle 103 can include one or more human-machine interfaces 134. For example, the vehicle 103 can include one or more display devices located onboard the vehicle 103. A display device of a user device (e.g., tablet, laptop, etc.) can be viewable by a user of the vehicle 103 that is located in the front of the vehicle 103 (e.g., driver's seat, front passenger seat). Additionally, or alternatively, a display device of a user device (e.g., tablet, laptop, etc.) can be viewable by a user of the vehicle 103 that is located in the rear of the vehicle 103 (e.g., back passenger seat(s)). The human machine interface(s) 134 can receive information from a user and/or provide information for display, as further described herein.

Figure 2:
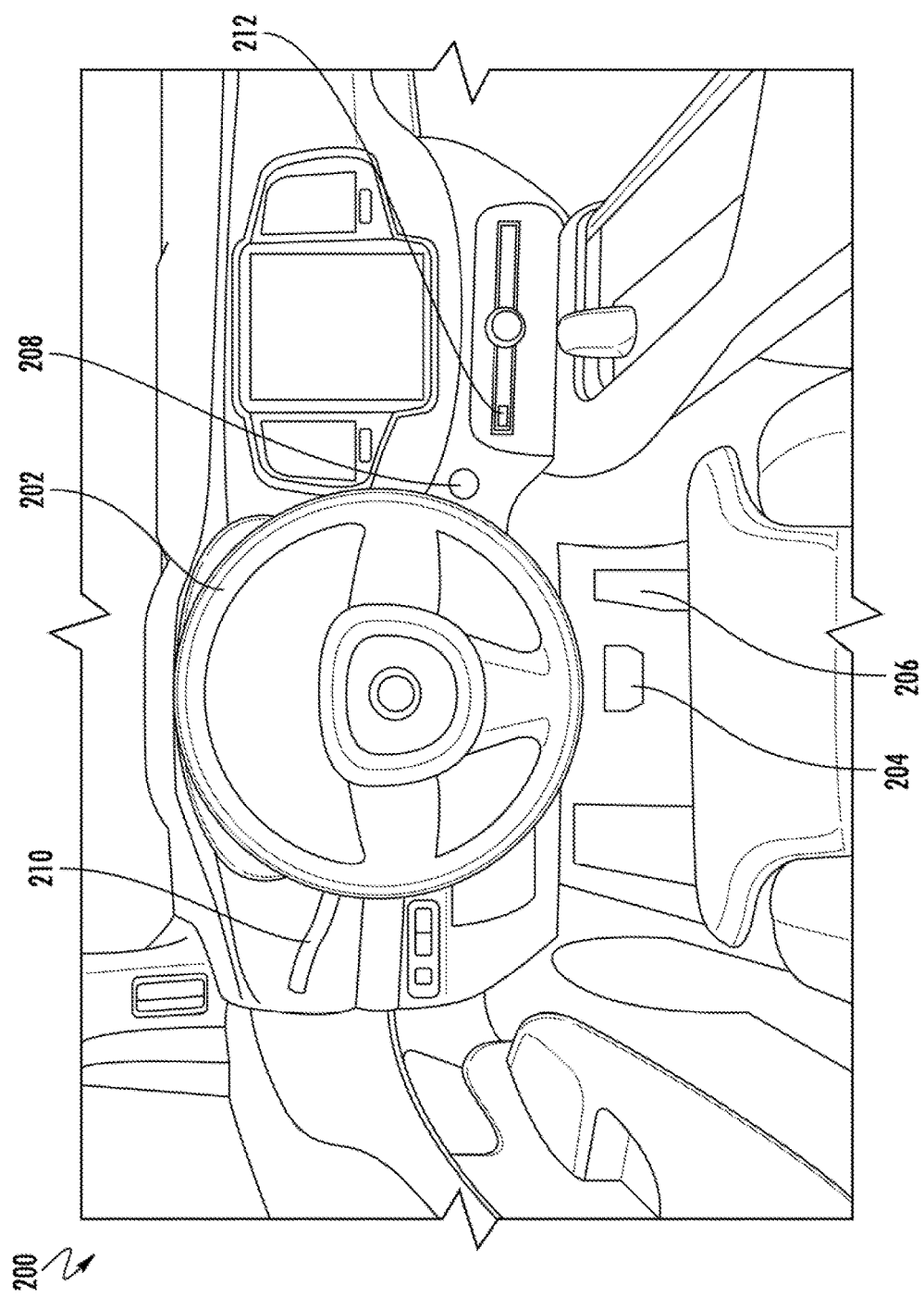
FIG. 2 depicts an example portion of a vehicle interior according to example embodiments of the present disclosure.

The vehicle 103 can include one or more vehicle input devices that are located onboard the vehicle 103 (e.g., on and/or within the vehicle 103). For example, FIG. 2 depicts an example portion of a vehicle interior 200 of the vehicle 103 showing vehicle input device(s) according to example embodiments of the present disclosure. FIG. 2 shows the vehicle interior associated with an automobile for example discussion purposes only and is not meant to be limiting. As described, the vehicle 103 can be other types of vehicles.

The vehicle input device(s) can be configured to adjust the operation of the vehicle 103 based at least in part on an input by a user with respect to the vehicle input device(s) such as by physical manipulation, by voice activation, etc. of the vehicle input device(s). When the vehicle input device(s) are enabled, a user can provide input with respect to the vehicle input device(s) to affect the operation of the vehicle 103 such as to control motion, motion indication, and/or other features associated with the vehicle 103.

The vehicle 103 can include one or more vehicle input devices that are configured to affect the motion of the vehicle 103. The vehicle input devices can include, for example, any vehicle input device that affects the vehicle direction of motion, any vehicle input device that locks the wheels of the vehicle 103, and/or any vehicle input device that otherwise affects the motion of the vehicle 103. Such vehicle input device(s) can include a steering mechanism 202 of the vehicle 103, a braking mechanism 204 of the vehicle 103, an acceleration mechanism 206 of the vehicle 103, and/or other devices. The steering mechanism 202 can include a device that can be adjusted to control the heading of the vehicle 103. For example, the steering mechanism 202 can include a steering wheel, control stick, etc. The braking mechanism 204 can include a device that can be adjusted to control the braking of the vehicle 103. For example, the braking mechanism 204 can include a brake pedal, parking brake, electronic braking system, etc. The acceleration mechanism 206 can include a device that can be adjusted to control the acceleration of the vehicle 103. For example, the acceleration mechanism 206 can include a gas pedal, hand throttle, etc. The vehicle input device(s) can also include a power state adjustment mechanism 208 of the vehicle 103 (e.g., push button, key switch, other interface). The vehicle input device(s) can also include a gearshift mechanism such as, for example, a gear shifter and/or a PRND control device (e.g., park-reverse-neutral-drive control).

The vehicle input device(s) can also include one or more vehicle input device(s) that are configured to control an indication of vehicle motion. For example, the vehicle input device(s) can include a turn indication mechanism 210 of the vehicle 103, a hazard indication mechanism 212 of the vehicle 103, and/or other devices. The turn indication mechanism 210 can include a device that can be adjusted to activate an indication (e.g., a turn signal) that the vehicle may turn. For example, the turn indication mechanism can include a turn signal control, etc. The hazard indication mechanism 212 can include a device that can be adjusted to control a hazard indication provided by the vehicle 103 (e.g., hazard lights). For example, the hazard indication mechanism can include a hazard light activation button, etc. Some vehicle input devices can be configured to control both the motion of the vehicle 103 and an indication of vehicle motion. For example, a braking mechanism 204 can be used to cause a deceleration (and/or stop) of the vehicle 103 as well as to activate the braking lights of the vehicle 103 (e.g., to indicate vehicle is decelerating, stopped, parked, etc.).

In some implementations, the vehicle input device(s) can be associated with other features of the vehicle 103. For instance, the vehicle input device(s) can be associated with control of the windshield wipers, headlights, fog lights, horn, vehicle sound system, windows, cabin lighting (e.g., overhead light, instrument panel brightness, etc.), temperature, fan speed, airflow, seat position and/or conditioning, defrost, hood release, truck release, etc. A user can provide input (e.g., physical manipulation, voice activation, etc.) with respect to such vehicle input devices to control the various aspects of the vehicle 103 associated with the respective vehicle input device.

One or more of the vehicle input devices can be disabled such that input by a user with respect to the vehicle input device(s) will not affect an operation of the vehicle 103. For example, returning to FIG. 1, the vehicle 103 can be configured to provide one or more vehicle services to one or more users 136 (e.g., passengers, customers, etc.). The vehicle service(s) can include transportation services (e.g., rideshare services), courier services, delivery services, and/or other types of services. The vehicle 103 can operate in a particular operating mode when providing the vehicle service to the user(s) 136. For example, the operations computing system 104 can receive a service request from a user 136. The operations computing system 104 can select the vehicle 103 to provide the requested services to the user 136. For instance, the operations computing system 104 can select the vehicle 103 to pick-up the user 136 and deliver the user 136 to a destination in accordance with a request for rideshare services. The operations computing system 104 can communicate with the vehicle 103 to instruct the vehicle 103 to pick-up the user 136 (e.g., a passenger of the vehicle 103 for a rideshare service). Moreover, the operations computing system 104 can provide a communication 138 to the vehicle 103 that instructs the vehicle 103 to enter into a first operating mode, such as the fully autonomous operating mode 106A of the vehicle 103. The vehicle computing system 102 can obtain the communication 138 and cause the vehicle 103 to enter into the first operating mode (e.g., the fully autonomous operating mode 106A) based at least in part on a communication 138. In this way, the vehicle 103 can operate in a preferred operating mode while providing the vehicle service(s). In some implementations, the vehicle computing system 102 can cause the vehicle 103 to enter into the first operating mode, without receiving the communication 138.

The vehicle computing system 102 can identify that the vehicle 103 is operating in a first operating mode. The vehicle computing system 102 can obtain data indicating whether the vehicle 103 is in a fully autonomous mode 106A, semi-autonomous mode 106B, manual mode 106C, etc. For example, the vehicle computing system 102 can monitor the state of an onboard interface (e.g., switch interface) to determine whether the vehicle 103 has been set to enter into the fully autonomous mode 106A. In some implementations, another computing device onboard the vehicle 103 that is configured to adjust the operating mode of the vehicle 103 (e.g., a mode manager system) can provide data indicative of the operating mode of the vehicle 103 (e.g., before, during, and/or after the vehicle 103 has completed a transition to the operating mode). Additionally, or alternatively, the vehicle computing system 102 can determine the operating mode of the vehicle 103 based at least in part on the communication 138 provided via a remote computing system (e.g., the operations computing system 104).

The vehicle computing system 102 can determine one or more vehicle input devices to be disabled based at least in part on the operating mode of the vehicle 103 (e.g., the fully autonomous mode 106A). For example, the vehicle computing system 102 can store (e.g., on the vehicle 103) a data structure that indicates which of the vehicle input device(s) located onboard the vehicle 103 are to be disabled in the event the vehicle 103 enters into a particular mode. The data structure can include a table, list, rule, tree, and/or other structure that can be modified to add, remove, edit, etc. the vehicle input devices(s) that are to be disabled for a particular operating mode. This can be advantageous when vehicle input device(s) are added, removed, and/or changed for newer models of a vehicle. In some implementations, such a data structure can be store remotely from the vehicle 103 and the vehicle computing system 102 can access the data structure via wireless communication. In some implementations, the data structure can be updated remotely from the vehicle 103 and provided to the vehicle 103 periodically (e.g., when changes are made).

The vehicle computing system 102 can select which vehicle input device(s) to disable based at least in part on the function of those devices. For instance, the vehicle computing system 102 can determine that the vehicle input device(s) that are configured to control and/or otherwise affect the motion of the vehicle 103 should be disabled while the vehicle 103 is in a fully autonomous operating mode 106A. For example, the vehicle input device(s) can include a first set of vehicle input device(s). The first set of vehicle input device(s) can be configured to at least partially control and/or affect a motion of the vehicle 103. For instance, the first set of vehicle input device(s) can include vehicle input devices that affect a direction of a motion of the vehicle 103, lock the wheels of the vehicle 103, and/or otherwise affect the motion of the vehicle 103. The first set of vehicle input devices can include at least one of the steering mechanism 202 of the vehicle 103, the braking mechanism 204 of the vehicle 103, the acceleration mechanism 206 of the vehicle 103, or the gearshift mechanism of the vehicle 103. In some implementations, the first set of vehicle input device(s) can also, or alternatively, include the power adjustment mechanism 208 of the vehicle 103.

Additionally, or alternatively, the vehicle computing system can determine that the vehicle input devices configured to control and/or affect the indication of motion should be disabled while the vehicle 103 is in the fully autonomous operating mode 106A. For example, the vehicle input device(s) can include a second set of vehicle input devices. The second set of vehicle input device(s) can be configured to at least partially control the indication of motion of the vehicle 103. For instance, the second set of input devices can include at least one of a turn indication mechanism 210 of the vehicle 103 or a hazard indication mechanism 212 of the vehicle 103.

In some implementations, the vehicle computing system 102 can select one or more other vehicle input device(s) to be disabled to avoid further user interference with the operation of the vehicle 103. For example, the vehicle input devices can include a third set of vehicle input devices that are configured to control other aspects of the autonomous vehicle (beyond motion and indication of motion). The third set of vehicle input devices can include, for example, the vehicle input devices associated with the vehicle's windows, windshield wipers, temperature control, etc. The vehicle computing system 102 can send one or more control signals to disable these vehicle input devices.

The vehicle computing system 102 can disable the one or more vehicle input devices such that an input by the user 136 with respect to the one or more vehicle input devices does not affect an operation of the vehicle 103. For example, the vehicle 103 can enter into a fully autonomous (e.g., self-driving) operating mode 106A. The vehicle computing system 102 can send one or more control signals to disable the steering mechanism 202, the braking mechanism 204, the acceleration mechanism 206, the power statement adjustment mechanism 208, etc. such that a user 136 (e.g., a passenger of a rideshare service) cannot interfere with the motion of the vehicle 103 while it autonomously navigates. The vehicle computing system 102 can also send one or more control signals to disable the turn indication mechanism 210, the hazard indication mechanism 212, etc. such that a user 136 cannot interfere with the indication of vehicle motion (e.g., via an incorrect lane change, inappropriate hazard lights). In this way, the vehicle computing system 102 can disable the vehicle input device(s) that are associated with controlling the motion of the vehicle 103 and/or indicating vehicle motion to others on a travel way to avoid unwanted user interference.

The vehicle input device(s) can be disabled in a variety of manners. In some implementations, a vehicle input device can be disabled electronically. By way of example, the acceleration mechanism 206 of the vehicle 103 can be associated with a throttle by wire system that controls the acceleration of the vehicle 103 based at least in part on communications from the acceleration mechanism 206 to a control device associated therewith. A throttle by wire system can include an electronic throttle without any cables from the acceleration mechanism to the engine (e.g., a throttle valve of the engine). Such a system can receive inputs from the acceleration mechanism 206 and send commands to control vehicle acceleration. To disable the acceleration mechanism 206, the vehicle computing system 102 can send one or more control signals to disable communication from the acceleration mechanism 206 such that input signals from the acceleration mechanism 206 are temporarily prevented and/or ignored. In this way, the speed of the vehicle 103 is not affected by compression (or release) of the acceleration mechanism 206 by the user 136. Similar such approaches can be undertaken for steering by wire and/or braking by wire type systems to disable the steering mechanism 202 and/or the braking mechanism 204.

In some implementations, a vehicle input device can be disabled mechanically. By way of example, a vehicle 103 can include a motor that is associated with the steering mechanism 202 (e.g., associated with a steering rack of the steering mechanism). The motor can control the motion of the steering mechanism 202. To disable the steering mechanism 202 such that input by a user is ineffective, the vehicle computing system 102 can send control signal(s) to activate the motor such that the steering mechanism 202 is moved with sufficient force so that a human user cannot overpower the motor to adjust the steering mechanism 202 in another manner (e.g., in an opposite direction, further in the same direction). Additionally, or alternatively, the motor could apply a counteractive force to any user input associated with the steering mechanism 202. In another example, the braking mechanism 204 (e.g., brake pedal) can be associated with an actuator (e.g., linear actuator). To disable the braking mechanism 204, the vehicle computing system 102 can send one or more control signal(s) to cause the actuator to stiffen and provide a resistance force such that a user 136 cannot compress the braking mechanism 204. A similar such approach could be used to disable the acceleration mechanism 206.

In some implementations, a vehicle input device can be mechanically disabled such that a user 136 can manipulate the input device but with no effect on the operation of the vehicle 103. For example, a mechanical device (e.g., actuator, motor) can be disconnected and/or caused to provide no resistance force such that a user 136 can manipulate the vehicle input device (e.g., compress the braking mechanism 204), but such manipulation would have no effect on the operation of the vehicle 103. This can provide a similar approach to the electronic disablement, as described herein.

In some implementations, the vehicle input device(s) can be disabled according to a tiered approach. Such a tiered approach can be identified, for example, in the data structure accessed by the vehicle computing system 102. For example, the vehicle computing system 102 can disable the first set of vehicle input device(s) such that an input by the user 136 with respect to at least one of the input device(s) in the first set vehicle input device(s) does not affect the operation of the vehicle 103 (e.g., the motion of the vehicle 103). After the first set of vehicle input device(s) are disabled, the vehicle computing system 102 can disable the second set of vehicle input device(s) such that an input by the user 136 with respect to at least one of the vehicle input device(s) of the second set of vehicle input device(s) does not affect the operation of the vehicle 103 (e.g., an indication of a motion of the vehicle 103). In this way, the motion control of the vehicle 103 can be disabled before motion indication control. Additionally, or alternatively, after the first and/or second set of vehicle input device(s) are disabled, the vehicle computing system 102 can disable one or more of the input devices in the third set of vehicle input device(s) such that an input by the user 136 with respect to at least one of the vehicle input device(s) of the third set of vehicle input device(s) does not affect the operation of the vehicle 103 (e.g., adjustment of the windows, temperature, etc.).

Figure 3:
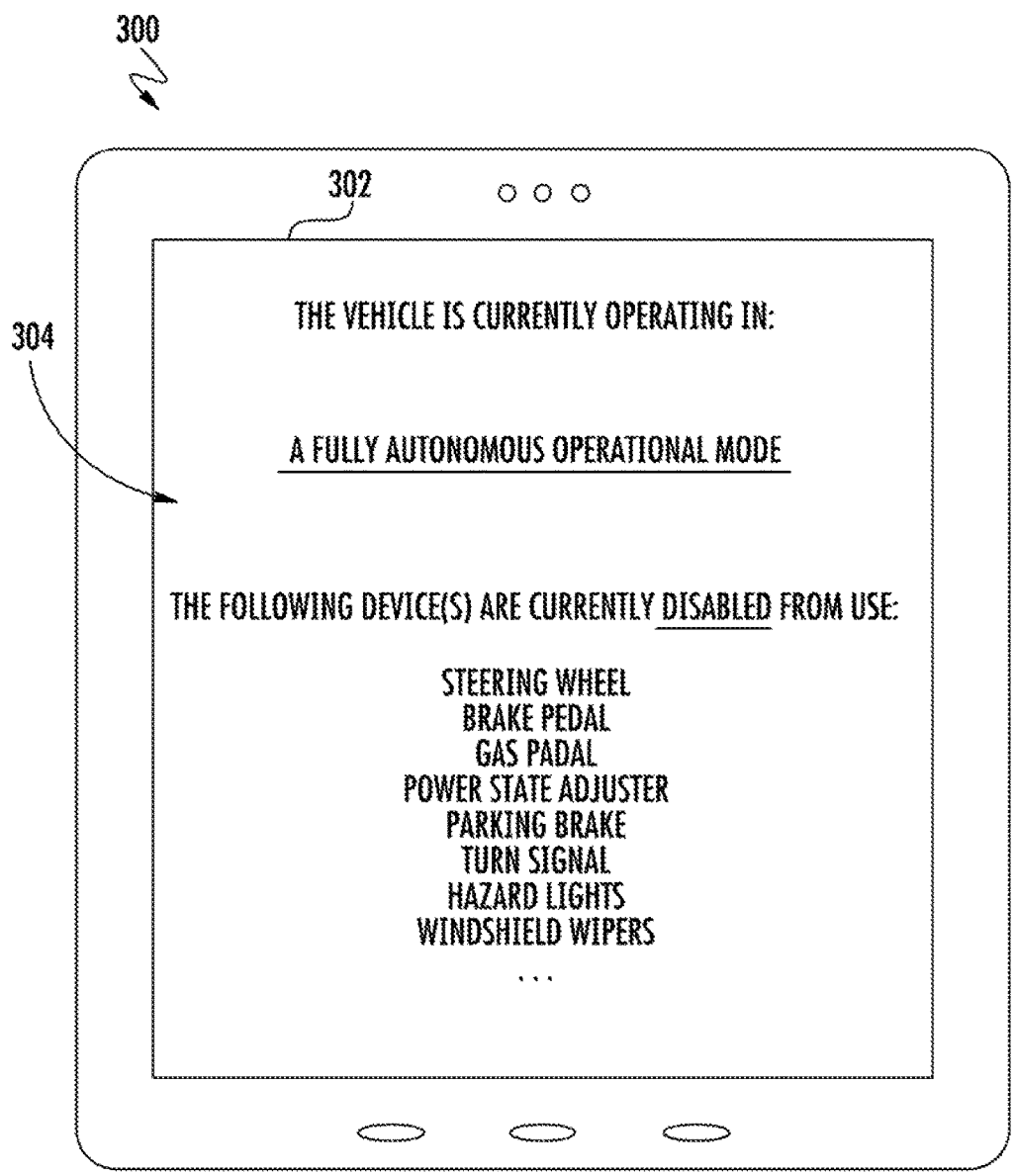
FIG. 3 depicts an example display device according to example embodiments of the present disclosure.

The vehicle computing system 102 can provide an indication that the vehicle input device(s) are disabled. For instance, FIG. 3 depicts an example display device 300 according to example embodiments of the present disclosure. The vehicle computing system 102 can provide, for display via a user interface 302, data 304 indicating that the one or more vehicle input devices are disabled. For example, the data 304 can identify the operating mode of the vehicle 103, one or more of the vehicle input device(s) that have been disabled, and/or otherwise indicate that the user 136 is not provided with control of the vehicle 103. Such information can be displayed by the display device 300 via a textual message, a graphical representation (e.g., symbol, picture, etc.), and/or via other types of communication (e.g., lighting change). The display device 300 can be located onboard the vehicle 103 (e.g., a tablet in the vehicle interior) and can be viewable by the user 136. Additionally, or alternatively, the display device 300 can be located remotely from the vehicle 103 (e.g., viewable for an operator that is remote from the vehicle 103). In some implementations, the user interface 302 can be displayed on a user device of the user 136. Other forms of communication can be used to inform the user 136 that one or more of the vehicle input devices are disabled. For example, a light element (e.g., LED light) in the interior cabin of the vehicle 103 can be illuminated when the vehicle input device(s) are disabled. In some implementations, the vehicle computing system 102 can cause an audible communication to be played (e.g., via speakers of the vehicle 103) to inform the user 136 of the operating mode of the vehicle 103, whether any of the vehicle input devices are disabled/enabled, which vehicle input devices are disabled/enabled, etc.

In some implementations, the vehicle computing system 102 can re-enable one or more of the vehicle input devices. For instance, the vehicle computing system 102 can identify a change in the operating mode of the vehicle 103. One or more vehicle input device(s) can be enabled based at least in part on the change in the operating mode of the vehicle 103. By way of example, the vehicle 103 can finish transporting a user 136 to a destination location and travel to a service depot for scheduled maintenance. The vehicle 103 can enter into (and/or be caused to enter into) the manual operating mode 106C such that a technician at the service depot can control the vehicle 103. The vehicle computing system 102 can identify that the vehicle 103 has changed from a first operating mode (e.g., a fully autonomous operating mode 106A) to a second operating mode (e.g., a manual control operating mode 106C) and enable one or more vehicle input devices such that the technician can control the vehicle 103. For example, one or more vehicle input devices (e.g., steering mechanism, hood release) that were previously disabled during the first operating mode can be enabled when the vehicle 103 is in the second operating mode.

Figure 4:
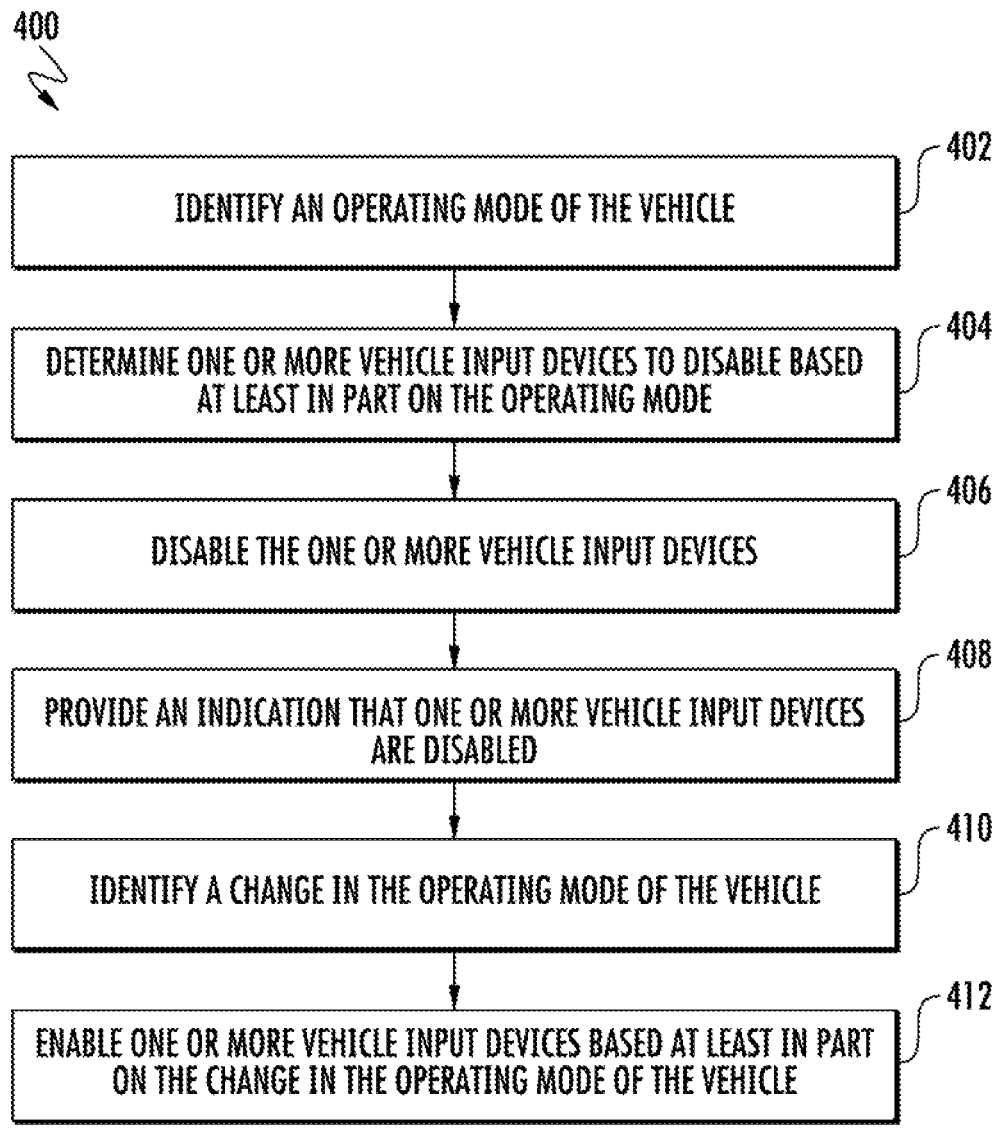
FIG. 4 depicts a flow diagram of an example method of disabling autonomous vehicle input devices according to example embodiments of the present disclosure.

FIG. 4 depicts a flow diagram of an example method 400 of disabling autonomous vehicle input devices according to example embodiments of the present disclosure. One or more portion(s) of the method 400 can be implemented by one or more computing devices such as, for example, the one or more computing device(s) of the vehicle computing system 102 (shown in FIG. 1). Each respective portion of the method 400 (e.g., 402-412) can be performed by any (or any combination) of the one or more computing devices. For example, one portion can be performed by a first computing device of the vehicle computing system 102 and another portion can be performed by the first computing device and/or a different computing device of the vehicle computing system 102. Moreover, one or more portion(s) of the method 400 can be implemented as an algorithm on the hardware components of the device(s) described herein (e.g., as in FIGS. 1 and 5) to, for example, disable autonomous vehicle input devices. FIG. 4 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. In some implementations, the vehicle computing system 102 can determine (e.g., locally, onboard the vehicle 103) that the vehicle 103 should enter into a particular operating mode. The vehicle computing system 102 can cause the vehicle 103 to enter into the operating mode, without receiving a communication 138 from a remote computing device.

At (402), the method 400 can include identifying an operating mode of the vehicle. For instance, the vehicle computing system 102 can identify an operating mode of a vehicle 103. The operating mode can be, for example, a fully autonomous operating mode 106A of the vehicle 103. As described herein, the vehicle computing system 102 can identify the operating mode via communication with one or more systems onboard the vehicle 103, via communication with one or more computing devices that are remote from the vehicle 103, and/or other approaches for determining the operating mode of the vehicle 103. For example, the vehicle 103 can receive a communication 138 from one or more computing devices that are remote from the vehicle 103 (e.g., the operations computing system 104). The communication 138 can instruct the vehicle 103 to enter into a particular operating mode (e.g., into the fully autonomous operating mode 106A). The vehicle computing system 102 can cause the vehicle 103 to enter into the instructed operating mode based at least in part on the communication 138.

At (404), the method 400 can include determining one or more vehicle input devices to disable based at least in part on the operating mode. For instance, the vehicle computing system 102 can determine one or more vehicle input devices to be disabled based at least in part on the operating mode of the vehicle 103. As described herein, the vehicle input devices are located onboard (e.g., on and/or within) the vehicle 103. For example, the vehicle input devices can include at least one of a steering mechanism 202 of the vehicle 103, a braking mechanism 204 of the vehicle 103, an acceleration mechanism 206 of the vehicle 103, or another vehicle input device that can affect the motion of the vehicle 103. The vehicle computing system 102 can determine that such vehicle input device(s) should be disabled such that a user 136 cannot affect operation of the vehicle 103 (e.g., vehicle motion) via input with respect to the vehicle input devices. Additionally, or alternatively, the vehicle input devices can include at least one of a turn indication mechanism 210 of the vehicle 103, a hazard indication mechanism 212 of the vehicle 103, or another vehicle input device that can affect an indication of motion of the vehicle 103. The vehicle computing system 102 can determine that such vehicle input device(s) should be disabled such that a user 136 cannot affect operation of the vehicle 103 (e.g., indication of vehicle motion) via input with respect to the vehicle input devices. The vehicle input devices can also, or alternatively, include vehicle input devices that control other aspects of the vehicle 103. In some implementations, the vehicle computing system 102 can determine that all vehicle input devices onboard the vehicle 103 (including, but not limited to, the vehicle input devices that affect a motion of the vehicle 103 and the vehicle input devices that affect an indication of a motion of the vehicle 103) are to be disabled when the vehicle 103 is in a particular operating mode (e.g., the fully autonomous operating mode 106A).

At (406), the method 400 can include disabling the one or more vehicle input devices. For instance, the vehicle computing system 102 can disable the one or more vehicle input devices such that an input by a user 136 with respect to the one or more vehicle input devices does not affect an operation of the vehicle 103. By way of example, the vehicle 103 can be configured to provide a vehicle service to a user 136. The vehicle service can be, for example, a transportation service, delivery service, etc. The user 136 can be a passenger of the vehicle 103 for the transportation service, a user of the delivery service, and/or a user of another service. The vehicle computing system 102 can send one or more control signals to disable one or more of the vehicle input devices such that an input (e.g., physical manipulation) by the user 136 with respect to the vehicle input device(s) does not interfere with the operation of the vehicle 103. For example, the vehicle computing system 102 can disable one or more vehicle input devices (e.g., steering mechanism 202, braking mechanism 204, acceleration mechanism 206, gearshift mechanism) such that the input by the user 136 with respect to the one or more vehicle input devices does not affect a motion of the vehicle 103, while providing vehicle services to the user 136. The vehicle computing system 102 can also disable one or more vehicle input devices (e.g., turn indication mechanism 210, hazard indication mechanism 212) such that an input by the user 136 with respect to the one or more vehicle input devices does not affect an indication of a motion of the vehicle 103, while providing vehicle services to the user 136.

At (408), the method 400 can include providing an indication that one or more vehicle input devices are disabled. For instance, the vehicle computing system 102 can provide, for display via a user interface 302 of a display device 300, data 304 indicating that the one or more vehicle input devices are disabled. As described herein, the display device 300 can located onboard the vehicle 103. The data 304 can indicate the operating mode of the vehicle 103, the vehicle input devices that are disabled and/or enabled, and/or other information associated with the vehicle 103.

At (410), the method 400 can include identifying a change in the operating mode of the vehicle. For instance, the vehicle computing system 102 can identify that the vehicle 103 is operating in a first mode, such as a fully autonomous operating mode 106A. The vehicle computing system 102 can identify when the vehicle 103 enters into a different operating mode, such as a manual operating mode 106C. The vehicle computing system 102 can enable one or more of the vehicle input devices based at least part on the change in the operating mode of the vehicle, at (412). For example, the vehicle computing system 102 can enable the vehicle input devices that are associated with the motion of the vehicle 103 (e.g., steering mechanism 202, braking mechanism 204, acceleration mechanism 206) such that a user can control the motion of the vehicle 103, while in the manual operating mode 106C.

FIG. 5 depicts an example computing system 500 according to example embodiments of the present disclosure. The example system 500 illustrated in FIG. 5 is provided as an example only. The components, systems, connections, and/or other aspects illustrated in FIG. 5 are optional and are provided as examples of what is possible, but not required, to implement the present disclosure. The example system 500 can include the vehicle computing system 102 of the vehicle 103 and, in some implementations, a remote computing system 510 including one or more remote computing device(s) that are remote from the vehicle 103 (e.g., the operations computing system 104) that can be communicatively coupled to one another over one or more networks 520. The remote computing system 510 can be associated with a central operations system and/or an entity associated with the vehicle 103 such as, for example, a vehicle owner, vehicle manager, fleet operator, service provider, etc.

The computing device(s) 501 of the vehicle computing system 102 can include processor(s) 502 and a memory 504. The one or more processors 502 can be any suitable processing device (e.g., a processor core, a microprocessor, an ASIC, a FPGA, a controller, a microcontroller, etc.) and can be one processor or a plurality of processors that are operatively connected. The memory 504 can include one or more non-transitory computer-readable storage media, such as RAM, ROM, EEPROM, EPROM, one or more memory devices, flash memory devices, etc., and combinations thereof.

The memory 504 can store information that can be accessed by the one or more processors 502. For instance, the memory 504 (e.g., one or more non-transitory computer-readable storage mediums, memory devices) on-board the vehicle 103 can include computer-readable instructions 506 that can be executed by the one or more processors 502. The instructions 506 can be software written in any suitable programming language or can be implemented in hardware. Additionally, or alternatively, the instructions 506 can be executed in logically and/or virtually separate threads on processor(s) 502.

For example, the memory 504 on-board the vehicle 103 can store instructions 506 that when executed by the one or more processors 502 on-board the vehicle 103 cause the one or more processors 502 (the vehicle computing system 102) to perform operations such as any of the operations and functions of the vehicle computing system 102, as described herein, the operations for disabling autonomous vehicle input devices (e.g., one or more portions of method 400), and/or any other functions for disabling autonomous vehicle input devices, as described herein.

The memory 504 can store data 508 that can be obtained, received, accessed, written, manipulated, created, and/or stored. The data 508 can include, for instance, data associated with an operating mode of the vehicle, data associated with one or more vehicle input devices (e.g., a data structure identifying vehicle input devices to be disabled), data associated with vehicle services, and/or other data/information as described herein. In some implementations, the computing device(s) 501 can obtain data from one or more memory device(s) that are remote from the vehicle 103.

The computing device(s) 501 can also include a communication interface 509 used to communicate with one or more other system(s) on-board the vehicle 103 and/or a remote computing device that is remote from the vehicle 103 (e.g., of remote computing system 510). The communication interface 509 can include any circuits, components, software, etc. for communicating via one or more networks (e.g., 520). In some implementations, the communication interface 509 can include, for example, one or more of a communications controller, receiver, transceiver, transmitter, port, conductors, software and/or hardware for communicating data.

The network(s) 520 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 520 can be accomplished, for instance, via a communication interface using any type of protocol, protection scheme, encoding, format, packaging, etc.

The remote computing system 510 can include one or more remote computing devices that are remote from the vehicle computing system 102. The remote computing devices can include components (e.g., processor(s), memory, instructions, data) similar to that described herein for the computing device(s) 501. Moreover, the remote computing system 510 can be configured to perform one or more operations of the operations computing system 104, as described herein.

Computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of disabling autonomous vehicle input devices, comprising:
   identifying, by a computing system comprising one or more computing devices, an operating mode of an autonomous vehicle;
   determining, by the computing system, one or more vehicle input devices to be disabled based at least in part on the operating mode of the autonomous vehicle, wherein the one or more vehicle input devices are located onboard the autonomous vehicle;
   disabling, by the computing system, the one or more vehicle input devices based at least in part on the identified operating mode of the autonomous vehicle such that an input by a user with respect to the one or more vehicle input devices does not affect an operation of the autonomous vehicle; and
   providing, by the computing system for display via a user interface of a display device, data indicating that the one or more vehicle input devices are disabled.

2. The computer-implemented method of claim 1, wherein the autonomous vehicle is configured to provide a vehicle service to the user, and
   wherein the vehicle service is a transportation service, and wherein the user is a passenger of the autonomous vehicle for the transportation service.

3. The computer-implemented method of claim 1, wherein the operating mode of the autonomous vehicle is a fully autonomous operating mode of the autonomous vehicle, and wherein disabling, by the computing system, the one or more vehicle input devices based at least in part on the identified operating mode of the autonomous vehicle such that the input by the user with respect to the one or more vehicle input devices does not affect the operation of the autonomous vehicle comprises:
disabling, by the computing system, the one or more vehicle input devices when the identified operating mode is the fully autonomous operating mode.

4. The computer-implemented method of claim 1, wherein disabling, by the computing system, the one or more vehicle input devices based at least in part on the identified operating mode of the autonomous vehicle such that the input by the user with respect to the one or more vehicle input devices does not affect the operation of the autonomous vehicle comprises:
disabling, by the computing system, the one or more vehicle input devices such that the input by the user with respect to the one or more vehicle input devices does not affect a motion of the autonomous vehicle.

5. The computer-implemented method of claim 4, wherein the one or more vehicle input devices comprise at least one of a steering mechanism of the autonomous vehicle, a braking mechanism of the autonomous vehicle, an acceleration mechanism of the autonomous vehicle, or a gear shift mechanism of the autonomous vehicle.

6. The computer-implemented method of claim 1, wherein disabling, by the computing system, the one or more vehicle input devices based at least in part on the identified operating mode of the autonomous vehicle such that the input by the user with respect to the one or more vehicle input devices does not affect the operation of the autonomous vehicle comprises:
disabling, by the computing system, the one or more vehicle input devices such that the input by the user with respect to the one or more vehicle input devices does not affect an indication of a motion of the autonomous vehicle.

7. The computer-implemented method of claim 6, wherein the one or more vehicle input devices comprise at least one of a turn indication mechanism of the autonomous vehicle or a hazard indication mechanism of the autonomous vehicle.

8. The computer-implemented method of claim 1, further comprising:
causing, by the computing system, the autonomous vehicle to enter into the operating mode based at least in part on a communication from one or more computing devices that are remote from the autonomous vehicle,
wherein the communication instructs the autonomous vehicle to enter into the operating mode.

9. The computer-implemented method of claim 1, wherein the display device is located onboard the autonomous vehicle.

10. A computing system for disabling autonomous vehicle input devices, comprising:
one or more processors; and
one or more tangible, non-transitory, computer readable media that collectively store instructions that when executed by the one or more processors cause the computing system to perform operations, the operations comprising:
identifying that an autonomous vehicle is operating in a fully autonomous operating mode;
determining one or more vehicle input devices to be disabled based at least in part on the fully autonomous operating mode of the autonomous vehicle,
wherein the one or more vehicle input devices are located onboard the autonomous vehicle;
disabling the one or more vehicle input devices such that an input by a user with respect to the one or more vehicle input devices does not affect an operation of the autonomous vehicle; and
providing, for display via a user interface of a display device, data indicating that the one or more vehicle input devices are disabled.

11. The computing system of claim 10, wherein the autonomous vehicle is configured to provide a vehicle service, and wherein the vehicle service is a delivery service.

12. The computing system of claim 10, wherein the one or more vehicle input devices comprise a first set of vehicle input devices, and
wherein disabling the one or more vehicle input devices such that the input by the user with respect to the one or more vehicle input devices does not affect the operation of the autonomous vehicle comprises:
disabling the first set of vehicle input devices such that an input by the user with respect to at least one of the input devices in the first set of vehicle input devices does not affect a motion of the autonomous vehicle.

13. The computing system of claim 12, wherein the first set of vehicle input devices comprises vehicle input devices that affect a direction of a motion of the autonomous vehicle, lock a wheel of the autonomous vehicle, or otherwise affect the motion of the autonomous vehicle.

14. The computing system of claim 13, wherein the first set of vehicle input devices further comprises a power state adjustment mechanism.

15. The computing system of claim 12, wherein the one or more vehicle input devices comprise a second set of vehicle input devices, and
wherein disabling the one or more vehicle input devices such that the input by the user with respect to the one or more vehicle input devices does not affect the operation of the autonomous vehicle comprises:
disabling, after the first set of vehicle input devices are disabled, the second set of vehicle input devices such that an input by the user with respect to at least one of the vehicle input devices of the second set of vehicle input devices does not affect an indication of a motion of the autonomous vehicle.

16. The computing system of claim 15, wherein the second set of vehicle input devices comprises a turn indication mechanism of the autonomous vehicle and a hazard indication mechanism of the autonomous vehicle.

17. An autonomous vehicle, comprising:
one or more vehicle input devices;
one or more processors; and
one or more tangible, non-transitory, computer readable media that collectively store instructions that when executed by the one or more processors cause the autonomous vehicle to perform operations, the operations comprising:
identifying that the autonomous vehicle is operating in an operating mode,
wherein the autonomous vehicle is configured to operate in a plurality of operating modes;
providing one or more control signals to disable the one or more vehicle input devices based at least in part on the operating mode such that an input by a user with respect to the one or more vehicle input devices does not affect an operation of the autonomous vehicle; and providing, for display via a user interface of a display device, data indicating that the one or more vehicle input devices are disabled.

18. The autonomous vehicle of claim 17, wherein the operations further comprise:

causing the autonomous vehicle to enter into the operating mode.

19. The autonomous vehicle of claim 17, wherein the display device is viewable by the user.

20. A computer-implemented method of disabling autonomous vehicle input devices, comprising:

identifying, by a computing system comprising one or more computing devices, an operating mode of an autonomous vehicle;

determining, by the computing system, one or more vehicle input devices to be disabled based at least in part on the operating mode of the autonomous vehicle, wherein the one or more vehicle input devices comprise at least one of a turn indication mechanism of the autonomous vehicle or a hazard indication mechanism of the autonomous vehicle; and disabling, by the computing system, the one or more vehicle input devices based at least in part on the identified operating mode of the autonomous vehicle such that an input by a user with respect to the one or more vehicle input devices does not affect an operation of the autonomous vehicle.

* * * * *